March 31, 1953     A. W. WOODWARD     2,633,388
WHEEL, RIM, AND COMBINATION

Filed March 25, 1948     2 SHEETS—SHEET 1

INVENTOR
ALVA W. WOODWARD

BY

ATTORNEY

*INVENTOR.*
ALVA W. WOODWARD

BY

ATTORNEY

Patented Mar. 31, 1953

2,633,388

UNITED STATES PATENT OFFICE 2,633,388

WHEEL, RIM, AND COMBINATION

Alva W. Woodward, Kent, Ohio, assignor to Wingfoot Corporation, Akron, Ohio, a corporation of Delaware Application March 25, 1948, Serial No. 17,056

10 Claims. (Cl. 301—12)

1

This invention relates to wheels and rims, and, more particularly, is concerned with rim and wheel combinations for demountably supporting pneumatic tires.

The art of demountable rims for supporting pneumatic tires has been in the process of development for many years, a wide gamut of constructions having been tried or suggested. However, many known constructions employ removable clamping lugs or clamps for securing demountable rims on wheels, particularly where the rims are used to carry larger pneumatic tires of the truck or bus type. Such removable lugs or clamps can get lost or soiled, and are sometimes difficult to position for uniform clamping action. Again, even the highly developed and well worked art of wheel and rim combinations is subject to improvement from the standpoints of simplicity, effectiveness, and cost.

It is the general object of the invention to avoid and overcome the foregoing and other difficulties of and objections to existing wheel and rim combinations by the provision of an improved rim structure and wheel combination characterized by simplicity, low cost, ease of operation, high strength, and great durability.

Another object of the invention is to provide a rim, and specifically, an endless rim of the side gutter type, having a plurality of lugs welded at circumferentially spaced points to the radially inner surface of the rim gutter.

Another object of the invention is the provision of a rim, such as described in the preceding paragraph, in which the securing lugs have oppositely inclined seating surfaces on their radially inner side, such surfaces being separated by a radially directed shoulder portion which provides the means through which the bolt or other fastening means extend to secure the rim to the wheel.

Another object of the invention is the provision of an improved dual wheel combination employing a pair of identical rims of the character described, one of the rims being mounted in an inboard overhang position and the other rim being mounted in an outboard overhang position.

The foregoing objects of the invention, and other objects which will become apparent as the description proceeds, are achieved by the provision of a rim having a plurality of lugs welded or secured to the radially inner surface of the rim at circumferentially spaced points, each lug including oppositely inclined seating portions on its radially inner side, such oppositely inclined seating portions being separated by a radially directed shoulder. Rims of the type described are

2 adapted to mounting on either single or dual wheels, the wheels providing one or more beveled seats adapted to engage with one or the other of the oppositely inclined seating surfaces on the rim lugs, and in the case of a dual wheel structure, the inboard and outboard rim seats on the wheel are made in the form of circumferentially spaced portions which are staggered in a circumferential direction to allow the inboard rim to pass over the outboard rim seat. In a dual wheel structure, the inboard rim is mounted on the inclined seating surfaces of the lugs to one side of the radial shoulder portions of the lug, and the other rim is mounted upon the oppositely inclined lug seating surfaces of the second rim.

For a better understanding of the invention, reference should be had to the accompanying drawings, wherein.

Figure 3:
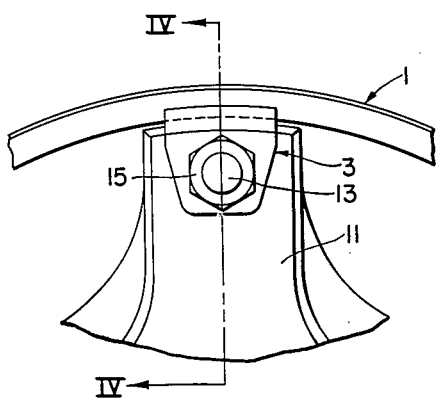
Fig. 3 is a fragmentary side elevation of a wheel and rim combination utilizing the invention.
Figure 4:
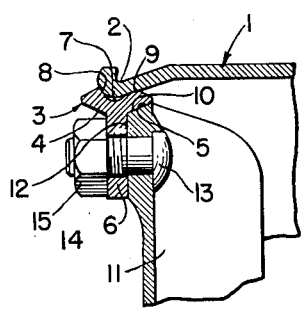
Fig. 4 is a vertical or radial cross-sectional view taken substantially on line IV—IV of Fig. 3.

In the drawings, and having particular reference to Figs. 3 and 4 thereof, the numeral 1 indicates generally a rim, for example, of the endless base type, usually having an integral side gutter 2 adapted to receive a split side ring or a split locking ring for removably securing a pneumatic tire (not shown) upon the rim 1. Secured to the rim 1 at a plurality of circumferentially spaced points are lugs or clamps 3. Each lug 3, as noted in Fig. 4, has substantially a Y-shape in cross-section as cut by a plane containing the rim axis and a radial of the rim. Stated another way, each lug 3 is formed with oppositely inclined seating surfaces 4 and 5 on its radially inner surface, and positioned between the inclined seating surfaces 4 and 5 is a radially-inwardly directed shoulder portion 6.

The radially outer surface of each lug 3 is formed with a circumferentially extending groove 7 which forms relatively narrow, circumferentially-extending, line-like areas 8 and 9 on the radially outer face of the lug. Each lug is most conveniently secured to the radially-inner surface of the gutter 2 of the rim, in the manner shown in Fig. 4, the line-like areas 8 and 9 of each lug being resistance welded to the rim by methods and apparatus hereinafter described.

The lugs are made from a rolled metal section, each lug being sheared from the section and coined to proper contour and radius.

The rim having its associated lugs is readily mounted upon a supporting wheel structure, one typical wheel assembly being illustrated in Figs. 3 and 4, wherein the numeral 10 indicates a beveled seat on the wheel which may be circumferentially continuous, but which is preferably provided by the wheel only at circumferentially spaced points, for example, by providing the beveled seat 10 upon the ends of spokes 11. The beveled seat 10 is adapted to engage and cooperate with either one of the inclined surfaces 4 or 5 on the radially inner face of the lug 3, but when only a single rim is to be mounted upon the wheel, usually the rim is positioned so that the inclined surface 5 of each rim lug 3 cooperates with the seating surface 10 on each spoke end in the manner shown in Fig. 4 in which case the rim is mounted in an inboard overhang position in the manner illustrated.

Associated with each beveled seating surface 10 on the wheel is a radially-directed shoulder portion 12 which normally serves as a support for the means securing the rim to the wheel. Such means usually take the form of a bolt 13 which extends from each spoke 11 laterally outboard in an axially parallel position, the bolt being adapted to extend through a suitable aperture in the shoulder portion 6 of each lug. The bolt 13 carries a nut 15 which when tightened forces the inclined seating surface 5 of the lug onto the beveled seating surface 10 of the wheel.

A feature of the invention is that the rim is not only supported radially by the engagement of the seats 5 and 10, but, in addition, the rim is properly aligned on the wheel by tightening each nut 15 so as to bring the shoulder portion 6 of each lug into lateral engagement with the shoulder portion 12 of each spoke of the wheel. This construction and combination is made possible by forming the beveled seat 10 on the ends of the spoke of a diameter and circumference just a few thousandths of an inch greater than the diameter and circumference of the inclined seating surfaces 5 on the rim lugs. In one typical embodiment of the invention, when mounting a rim having a diameter of twenty inches, the median diameter of the inclined seating surfaces 10 on the wheel spokes 11 was made twenty and one-sixteenth inches and the median diameter of the inclined seating surfaces 5 on the rim lug was made twenty inches. The slightly larger diameter of the beveled seating surface 10 on the wheel is such that when the nuts 15 are drawn down to force the shoulder portion 6 of each lug into lateral engagement with the shoulder portion 12 of the spoke ends there is a very slight flattening or chording of the rim between each supporting spoke. This chording or flattening of the rim between each pair of fastening lugs or spokes has not been found to be objectionable, and, in fact, is highly advantageous for reasons of positive alignment and firmness of rim support.

Figure 5:
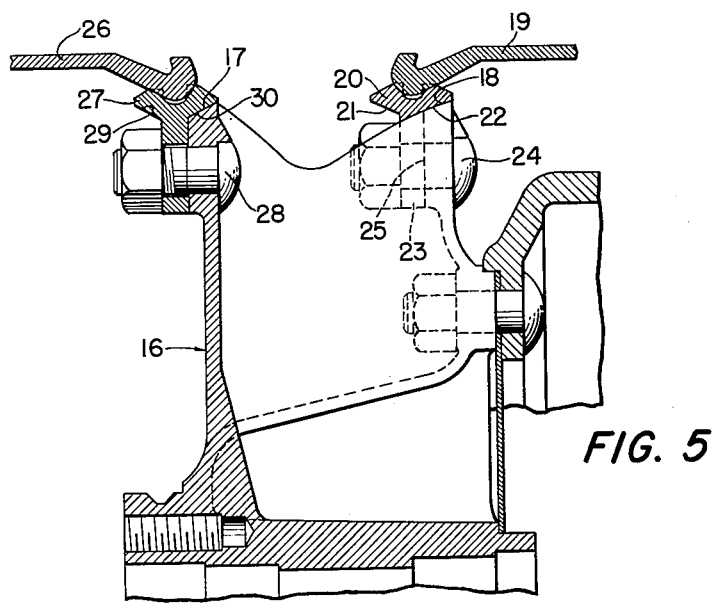
Fig. 5 is a view similar to Fig. 4 but illustrating the dual rim mounting embodiment of the invention.

Fig. 5 illustrates a dual wheel combination incorporating the features of the invention. In the particular embodiment of the invention illustrated in the drawings, the numeral 16 indicates generally a wheel having a series of circumferentially-spaced beveled outboard seating surfaces 17, and axially spaced therefrom a plurality of circumferentially-spaced beveled inboard seating surfaces 18. It will be understood that the inboard seating surfaces 18 are spaced approximately midway, in a circumferential direction, between the outboard seating surfaces 17 so as to permit the movement of the inboard rim 19 and associated lugs 20 past the outboard seating surfaces 17. The lugs 20 mounting the inboard rim and the rim itself are constructed substantially in accord with the rim and lug description given in conjunction with Figs. 3 and 4, and it will be evident that the lugs 20 are formed with oppositely-inclined, beveled seating surfaces 21 and 22, and with a radially-directed shoulder portion 23. The inclined seating surface 22 of each lug 20 is adapted to engage with the cooperating beveled seating surface 18 on the inboard rim seat of the wheel, and bolt means 24 mounted in association with the inboard rim seat being adapted to pull the shoulder portion 23 of each rim lug against a corresponding shoulder portion 25 on the wheel, all in the manner heretofore described.

Similarly, a rim 26 having lugs 27 secured thereto, the rim and lugs being identical to the rim 19 and lugs 20, is fastened demountably upon the outboard beveled seat 17 by bolt means 28 associated with the outboard rim seat. It is to be particularly noted, however, that the lugs 27 having oppositely inclined seating portions 29 and 30, are secured by the fastening means 28 so that the inclined seating surfaces 30 of each rim lug engages with the beveled seating surface 17 of the wheel. In other words, when a rim is mounted upon the inboard seating surfaces 18 of the wheel the rim lugs engage on one series of inclined seating surfaces, and when the rim is mounted upon the outboard seating surfaces 17 the oppositely positioned seating surfaces of the rim lugs, with relation to the lateral center of the rim, engage with the wheel. The inboard rim 19 extends in an inboard overhang position with relation to the wheel and the outboard rim 26 is supported in an outboard overhang position with respect to the wheel. Both the inboard and outboard rims are positively aligned with the wheel by reason of the engagement of the shoulder portion of each lug with the shoulder portions of the wheel, with the attendant slight chording action of the rim between each pair of fastening lugs.

Figure 6:
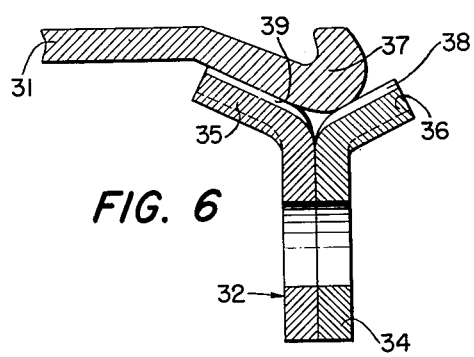
Figs. 6 and 7 are respectively cross-sectional views before and after welding a modified form of lug to the rim.
Figure 8:
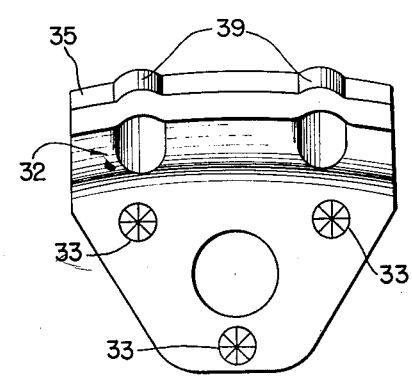
Fig. 8 is a front elevation of the lug of Figs. 6 and 7.

Turning now to the modified form of lug or clamp as illustrated in Fig. 6, the numeral 31 indicates a rim substantially of the type heretofore described, to which is secured at circumferentially spaced positions a plurality of lugs, each lug being indicated as a whole by the numeral 32. Each lug 32 is formed of two stamped metal parts placed back to back and spot welded or otherwise secured together at 33 (Fig. 8) so that in radial and axial section, as before, the lug will have substantially a Y-shape in cross-section. Or, stated in another manner, each lug will have a radially directed shoulder portion 34 which separates oppositely inclined seating surfaces 35 and 36. The seat 36 is preferably made somewhat shorter than the seat 35. The radially outer surface of each lug forms a trough or groove which is adapted to receive and be secured to the radially inner surface of a gutter portion 37 on the rim 31.

Figure 7:
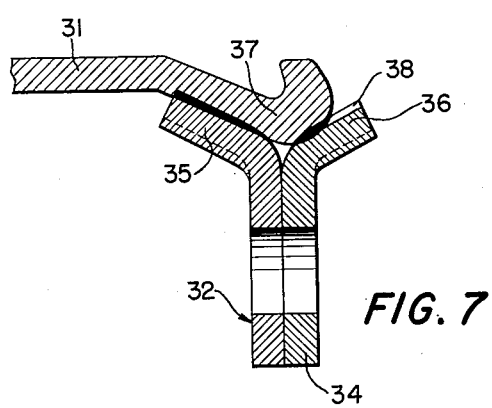

To facilitate securing each lug 32 to the rim 31 by a resistance welding operation, each of the stamped metal parts forming the lug 32 is formed on its radially outer surface in the manner illustrated in Fig. 6, namely, with inclined, narrow line-like areas 38 and 39 which prior to welding are adapted to engage with the gutter portion 37 of the rim as shown in Fig. 6. After the resistance welding operation, the lug 32 will bear the relation with the gutter portion 37 of the rim 31 as shown in Fig. 7.

Figure 1:
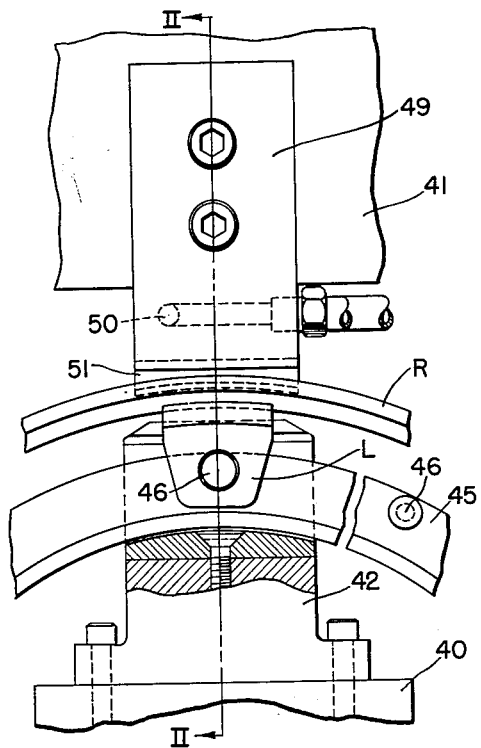
Fig. 1 is a front elevation, partly broken away, of one embodiment of apparatus for performing the method of the invention.
Figure 2:
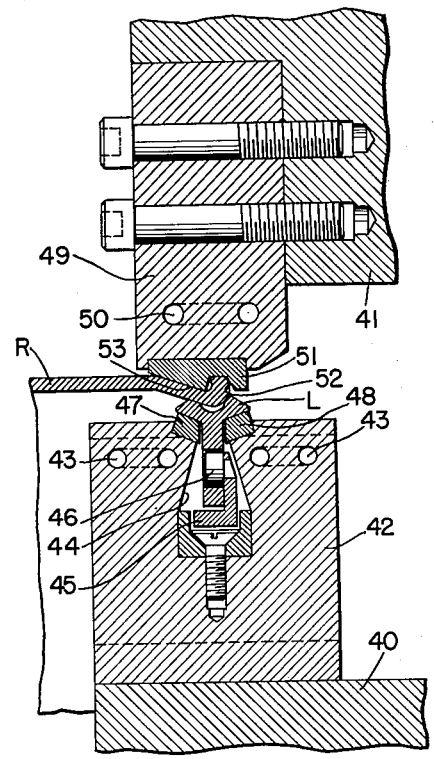
Fig. 2 is a vertical sectional view taken substantially on line II—II of Fig. 1.

Turning now to Figs. 1 and 2 of the drawing, these figures illustrate one embodiment of apparatus incorporating the principles of the invention. More particularly, the numerals 40 and 41 indicate respectively the bead and an associated movable ram of a resistance or spot welding apparatus of the pulsation or controlled cycle type wherein the welding starts under high pressure, is later changed to normal low pressure and is completed under high pressure to give a forging action. Mounted upon the bed 40 is a die 42 having passages 43 therein through which cooling fluid may be circulated. The die 42 is formed with a laterally extending groove 44 which slidably receives an endless ring 45. The ring 45 carries at circumferentially-spaced points forwardly extending pins 46 each of which receives and positions a lug or clamp L in the manner shown in the drawings. At the top of the die 42 on each side of the groove 44 are mounted electrodes 47 and 48 whose top surfaces are curved and inclined so as to engage with and support the oppositely inclined radially inner surfaces of the lug L.

The movable ram 41 of the welding machine carries a die 49 which may be fluid cooled by passages 50, the die carrying an electrode 51 which is adapted to engage with the rim R. In the form of the invention illustrated, the rim R has the integral side gutter portion to which each lug L is welded and to facilitate this operation the electrode 51 is formed with a groove 52 which receives the radially outer edge of the rim gutter, the bottom of the groove 52 being appropriately curved to the same curvature as the rim so that the edge of the rim gutter will bottom in the groove. The electrode 51 is also formed with a shoulder or surface 53 which is appropriately curved and inclined to contact with the radially outer surface of the rim gutter in the region of the lug L.

In the operation of the apparatus as described, a lug L carried by the ring 45 is positioned on the electrodes 47 and 48 and the radially-inner surface of the gutter portion of the rim R is fitted down into the groove in the top of the lug whereupon the ram 41, die 49, and electrode 51 are moved down to engage with the gutter portion of the rim in the manner illustrated and previously described. Now welding current in cyclically controlled amounts is passed to the electrodes and through the rim and lug. High pressure is initially applied on the electrodes and as the material to be welded softens under the flow of welding current, the welding pressure is lowered, and once the welding current is shut off, the electrodes are subjected to high pressure to effect a forging of the weld. The resistance welding action is concentrated in the line-like areas of contact, heretofore described, between the rim and lug, and any material displaced during the welding or forging action on the weld is free to flow into the groove at the center of the lug, or to flow in the opposite direction out to the one side or other of the lug. The result is a very firm and satisfactory bond or weld between the lug and rim.

After the welding operation described, the ram 41 is raised and the rim R and ring 45 are rotated on their axes to bring a second lug into position on the electrodes 47 and 48. The second lug is, of course, positioned by a pin 46 on the ring 45 so that the lugs are properly spaced on the rim in a circumferential direction. The resistance welding operation as described is now again performed to secure the second lug to the rim, and the desired number of additional lugs are secured to the rim in a similar manner.

From the foregoing, it will be recognized that the various objects of the invention have been achieved by the provision of a relatively inexpensive, but durable and long-lived rim structure adapted for single or dual wheel mounting. The rim when employed in combination with a single or dual mounting is accurately aligned and strongly supported, but can be easily and quickly mounted or demounted when desired. The rim can be given either an inboard or an outboard overhang mounting because of the oppositely inclined seats on the mounting lugs, which lugs are permanently fastened to the rim so that they cannot get lost. In accord with the method and apparatus of the invention, the lugs are permanently fastened to the rim in a rapid, accurate and positive manner.

While in accord with the patent states certain embodiments of the invention have been illustrated and described in detail, it is to be particularly understood that the invention is not to be limited thereto or thereby, but that the scope of the invention is defined in the appended claims.

What is claimed is:

1. In combination, a wheel, circumferentially-spaced beveled surfaces on the wheel, substantially radially directed shoulders associated with the beveled surfaces, an endless rim having a side gutter, lugs welded at circumferentially-spaced points to the radially inner side of the gutter, each lug in section having substantially a Y-shape, the radially outer surfaces of the non-radial legs of the lug being resistance welded at axially-spaced but wide line-like areas to the radially inner side of the gutter, means carried by the wheel and clamping the radial leg of each lug over substantially its full length against a shoulder on the wheel and engaging the radial inner surface of one non-radial leg of each lug in wedging relation with a beveled surface on the wheel, the effective diameter of the beveled surfaces on the wheel being slightly greater than the effective diameter of the radially inner wedging surfaces of the lugs whereby the rim is chorded very slightly between the lugs.

2. In combination, a wheel, circumferentially-spaced beveled surfaces on the wheel, substantially radially directed shoulders associated with the beveled surfaces, an endless rim having a side gutter, lugs welded at circumferentially-spaced points to the radially inner side of the gutter, each lug in section having substantially a Y-shape, the radially outer surfaces of the non-radial legs of the lug being resistance welded at axially-spaced but wide line-like areas to the radially inner side of the gutter and leaving the bottom of the gutter unsecured to the lug, means carried by the wheel and clamping the radial leg of each lug over substantially its full length against a shoulder on the wheel and engaging the radial inner surface of one non-radial leg of each lug in wedging relation with a beveled surface on the wheel.

3. In combination, a wheel, circumferentially-spaced beveled surfaces on the wheel, substantially radially directed shoulders associated with the beveled surfaces, an endless rim having a side gutter, lugs welded at circumferentially-spaced points to the radially inner side of the gutter, each lug in section having substantially a Y-shape, the radially outer surfaces of the non-radial legs of the lug being resistance welded at axially-spaced areas to the radially inner side of the gutter and leaving the bottom of the gutter unsecured to the lug, means carried by the wheel and engaging the radial inner surface of one non-radial leg of each lug in wedging relation with a beveled surface on the wheel, the radial inner surfaces of the lugs having a smaller diameter than the beveled surfaces on the wheel.

4. In combination, a wheel having beveled seat means and substantially radially-directed flat surfaced shoulder means, a rim having a side gutter, lug means welded to the radially-inner surface of the side gutter, the radially-outer surface of the lug means having a circumferentially-extending groove therein receiving the gutter, the radius of the groove being sharper than the radius of the gutter, a beveled surface and flat surfaced substantially radially-directed shoulder means on the lug means, and means on the wheel for drawing the beveled surface and shoulder means on the lug means into engagement with the beveled seat and shoulder means on the wheel, the shoulder means being in abutted engagement for the entire length of the shoulder means on the lug means.

5. In combination, a wheel having beveled seat means and substantially radially-directed flat surfaced shoulder means, a rim, lug means welded to the radially-inner surface of the rim, the radially-outer surface of the lug means having a circumferentially-extending groove therein receiving a portion of the rim, a beveled support engaging surface and flat surfaced shoulder means on the lug means, and means on the wheel for drawing the beveled surface and shoulder means on the lug means into engagement with the beveled seat and shoulder means on the wheel, the shoulder means of the lug means engaging with the shoulder means on the wheel in non-tilting relationship.

6. In combination, a wheel, circumferentially-spaced portions on the wheel, each portion having a beveled seat and a flat substantially radial shoulder, a rim, lugs secured to the inner side of the rim at points corresponding to the spaced portions on the wheel, each lug having a beveled surface and a flat substantially radial abutment, a bolt on each wheel portion and extending through the associated lug for drawing the beveled lug surfaces and the lug abutments into engagement with the beveled seats and shoulders of the wheel portions, the flat of each shoulder being in engagement with the flat of each abutment so as to center and align the rim and the wheel, the effective diameter of the beveled seats being slightly greater than the effective diameter of the beveled lug surfaces to chord the rim only slightly between wheel portions when the bolts are tightened.

7. In combination, a wheel, rim including an endless body portion having a side gutter, a plurality of lugs resistance welded to the radially-inner surface of the side gutter at circumferentially spaced points, the lugs having a circumferentially-extending groove of sharper radius than the radius of the radially-inner surface of the side gutter which the groove receives whereby each lug is welded to the rim by axially-spaced, circumferentially extending rather wide line-like areas, and means extending through the lugs to secure the rim to the wheel.

8. A rim including an endless body portion having a side gutter, a plurality of lugs welded to the radially-inner surface of the side gutter at circumferentially spaced points, the lugs having a circumferentially-extending groove of sharper radius than the radius of the radially-inner surface of the side gutter which the groove receives whereby each lug is welded to the rim by axially-spaced, circumferentially extending rather wide line-like areas.

9. An endless rim having a bead-like portion extending radially inwardly of the base thereof, a plurality of lugs secured to the rim at circumferentially-spaced points in contact with the bead-like portion, each lug being formed from two substantially similar parts including a substantially radially-directed flat surfaced shoulder portion and an obliquely directed seating portion, the parts of each lug having the shoulder portions being abutted over the length thereof and secured together and the seating portions oppositely inclined to engage on opposite sides of the bead-like portion of the rim.

10. In combination, a wheel, an inboard set of spokes on the wheel, an outboard set of spokes on the wheel, each spoke in the outboard set being positioned in a circumferential direction approximately midway between the nearest inboard spokes, each spoke end being formed with a similarly inclined seat and a radial shoulder portion, a pair of identical endless, side gutter rims, a plurality of circumferentially spaced lugs secured to the radially inner side of the side gutter, each lug having oppositely inclined seating surfaces on its radially inner surface, a radially directed shoulder portion on each lug between said seating surfaces, and means extending throught the shoulder portion on each lug and secured to a spoke for holding one rim in an inboard overhang position on the inboard spokes and the other rim in an outboard overhang position on the outboard spokes, the inboard rim resting on the inclined seating surfaces on one side of its rim lugs, and the outboard rim resting on the oppositely positioned seating surfaces of its associated rim lugs with relation to the lateral center of the rim, said means pulling the shoulder portions on the lugs in non-tilting relation against the shoulder portions on the spokes.

ALVA W. WOODWARD.

REFERENCES CITED

The following references are of record in the file of this patent:

UNITED STATES PATENTS

| Number | Name | Date |
|---|---|---|
| Re. 20,022 | Burger | June 30, 1936 |
| 1,751,086 | Hunt | Mar. 18, 1930 |
| 1,752,598 | Jorgensen | Apr. 1, 1930 |
| 1,794,760 | Doyle | Mar. 3, 1931 |
| 2,027,408 | Walther | Jan. 14, 1936 |
| 2,048,177 | Burger | July 21, 1936 |
| 2,239,463 | Mills | Apr. 22, 1941 |
| 2,241,839 | Woodward | May 13, 1941 |
| 2,272,889 | Brink | Feb. 10, 1942 |